US011922963B2

(12) United States Patent
Wang et al.

(10) Patent No.: US 11,922,963 B2
(45) Date of Patent: Mar. 5, 2024

(54) SYSTEMS AND METHODS FOR HUMAN LISTENING AND LIVE CAPTIONING

(71) Applicant: MICROSOFT TECHNOLOGY LICENSING, LLC, Redmond, WA (US)

(72) Inventors: Xiaofei Wang, Bellevue, WA (US); Sefik Emre Eskimez, Bellevue, WA (US); Min Tang, Yarrow Point, WA (US); Hemin Yang, Bellevue, WA (US); Zirun Zhu, Bellevue, WA (US); Zhuo Chen, Woodinville, WA (US); Huaming Wang, Clyde Hill, WA (US); Takuya Yoshioka, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/331,448

(22) Filed: May 26, 2021

(65) Prior Publication Data
US 2022/0383887 A1 Dec. 1, 2022

(51) Int. Cl.
*G10L 21/0208* (2013.01)
*G06N 3/084* (2023.01)
(Continued)

(52) U.S. Cl.
CPC .......... *G10L 21/0208* (2013.01); *G06N 3/084* (2013.01); *G10L 25/30* (2013.01); *G10L 25/51* (2013.01)

(58) Field of Classification Search
CPC ...... G10L 21/0208; G10L 25/30; G10L 25/51
See application file for complete search history.

(56) References Cited

U.S. PATENT DOCUMENTS

2007/0288242 A1* 12/2007 Spengler ................. G10L 15/20
704/E15.04
2010/0153104 A1* 6/2010 Yu ....................... G10L 21/0208
704/E15.039
(Continued)

OTHER PUBLICATIONS

Ochiai, T., Watanabe, S., Hori, T., & Hershey, J. R. (Jul. 2017). Multichannel end-to-end speech recognition. In International conference on machine learning (pp. 2632-2641). PMLR.*

(Continued)

*Primary Examiner* — Bryan S Blankenagel
(74) *Attorney, Agent, or Firm* — Workman Nydegger

(57) ABSTRACT

Systems and methods are provided for generating and operating a speech enhancement model optimized for generating noise-suppressed speech outputs for improved human listening and live captioning. A computing system obtains a speech enhancement model trained on a first training dataset to generate noise-suppressed speech outputs and an automatic speech recognition model trained on a second training dataset to generate transcription labels for spoken language utterances. A third training dataset comprising a set of spoken language utterances is applied to the speech enhancement model to obtain a first noise-suppressed speech output which is applied to the automatic speech recognition model to generate a noise-suppressed transcription output for the set of spoken language utterances. Speech enhancement model parameters are updated to optimize the speech enhancement model to generate optimized noise-suppressed speech outputs based on a comparison of the noise-suppressed transcription output and ground truth transcription labels.

22 Claims, 8 Drawing Sheets

(51) Int. Cl.
G10L 25/30 (2013.01)
G10L 25/51 (2013.01)

(56) References Cited

U.S. PATENT DOCUMENTS

| | | | | |
|---|---|---|---|---|
| 2019/0122685 | A1* | 4/2019 | Defraene | G06N 3/08 |
| 2020/0135209 | A1* | 4/2020 | Delfarah | G10L 15/20 |
| 2020/0327884 | A1* | 10/2020 | Bui | G10L 15/075 |
| 2021/0065002 | A1* | 3/2021 | Samek | G06N 3/063 |
| 2021/0256386 | A1* | 8/2021 | Wieman | G06N 3/0454 |
| 2021/0390946 | A1* | 12/2021 | Wang | G10L 15/02 |
| 2022/0084509 | A1* | 3/2022 | Sivaraman | G06N 3/0454 |
| 2022/0148571 | A1* | 5/2022 | Wang | G10L 25/18 |
| 2022/0180056 | A1* | 6/2022 | Hong | G06F 40/30 |

OTHER PUBLICATIONS

Braun, et al., "Towards efficient models for real-time deep noise suppression", In Repository of arXiv:2101.09249v1, Jan. 22, 2021, 5 Pages.

Chan, et al., "Listen, Attend and Spell: A Neural Network for Large Vocabulary Conversational Speech Recognition", In Proceedings of IEEE International Conference on Acoustics, Speech and Signal Processing, Mar. 20, 2016, pp. 4960-4964.

Chen, et al., "Speech enhancement and recognition using multi-task learning of long short-term memory recurrent neural networks", In Proceedings of 16th Annual Conference of the International Speech Communication Association, Sep. 6, 2015, 7 Pages.

Choi, et al., "Phase-aware speech enhancement with deep complex u—", In Proceedings of International Conference on Learning Representations, Feb. 4, 2019, pp. 1-20.

Chorowski, et al., "Towards Better Decoding and Language Model Integration in Sequence to Sequence Models", In Repository of arXiv:1612.02695v1, Dec. 8, 2016, 6 Pages.

De, et al., "Impact of digital surge during covid-19 pandemic: A viewpoint on research and practice", In International Journal of Information Management, vol. 55, Dec. 2020, 6 Pages.

Fonseca, et al., "Freesound datasets: a platform for the creation of open audio datasets", In Proceedings of 18th International Society for Music Information Retrieval Conference, Oct. 23, 2017, pp. 486-493.

Gamper, et al., "Intrusive and non-intrusive perceptual speech quality assessment using a convolutional neural network", In Proceedings of Workshop on Applications of Signal Processing to Audio and Acoustics, Oct. 20, 2019, pp. 85-89.

Gemmeke, et al., "Audio set: An ontology and human-labeled dataset for audio events", In Proceedings IEEE International Conference on Acoustics, Speech and Signal Processing, Mar. 5, 2017, pp. 776-778.

Giri, et al., "Improving speech recognition in reverberation using a room-aware deep neural network and multi-task earning", In Proceedings of IEEE International Conference on Acoustics, Speech and Signal Processing, Apr. 19, 2015, pp. 5014-5018.

Hu, et al., "Dccrn: Deep complex convolution recurrent network for phase-aware speech enhancement", In Repository of arXiv:2008.00264v4, Sep. 23, 2020, 5 Pages.

Isik, et al., "Poconet: Better speech enhancement with frequency-positional embeddings, semi-supervised nversational data, and biased loss", In Repository of arXiv:2008.04470v1, Aug. 11, 2020, 5 Pages.

Wenniger, et al., "Speech enhancement with lstm recurrent neural networks and its application to noise-robust asr", In Proceedings of International Conference on Latent Variable Analysis and Signal Separation, Aug. 15, 2015, pp. 91-99.

Kinoshita, el al., "Improving noise robust automatic speech recognition with single-channel time-domain enhancement network", In Proceedings of IEEE Conference on Acoustics, Speech and Signal Processing, May 4, 2020, pp. 7009-7013.

Li, et al., "Advancing Acoustic-to-Word CTC Model", In Proceedings of the IEEE International Conference on Acoustics, Speech and Signal Processing, Apr. 15, 2018, pp. 5794-5798.

Li, et al., "Improving Layer Trajectory LSTM with Future Context Frames", In Proceedings of the IEEE International Conference on Acoustics, Speech and Signal Processing, May 12, 2019, pp. 6550-6554.

Meng, et al., "Deep long short-term memory adaptive beamforming networks for multichannel robust speech recognition", In Proceedings of IEEE International Conference on Acoustics, Speech and Signal Processing, Mar. 5, 2017, pp. 271-275.

Minhua, et al., "Frequency domain multi-channel acoustic modeling for distant speech recognition", In Proceedings of IEEE International Conference on Acoustics, Speech and Signal Processing, May 12, 2019, pp. 6640-6644.

Panayotov, el al., "Librispeech: an Asr Corpus Based on Public Domain Audio Books", In Proceedings of IEEE International Conference on Acoustics, Speech and Signal Processing, Apr. 19, 2015, pp. 5206-5210.

Pascual, et al., "Segan: Speech enhancement generative adversarial network", In Repository of arXiv: 170309452v3, Jun. 9, 2017, 5 Pages.

Paszke, et al., "PyTorch: An imperative style, high-performance deep learning library", In Repository of arXiv:1912.01703v1, Dec. 3, 2019, 12 Pages.

Pironkov, et al., "Multi-task learning for speech recognition: an overview", In Proceedings of European Symposium on Artificial Neural Networks, Computational Intelligence and Machine Learning, Apr. 27, 2016, pp. 189-194.

Raffel, et al., "mir eval: A transparent implementation of common mir metrics", In Proceedings of Proceedings—15th International Society for Music Information Retrieval Conference, Oct. 2014, 7 Pages.

Rix, et al., "Perceptual Evaluation of Speech Quality (PESQ)—A New Method for Speech Quality Assessment of Telephone Networks and Codecs", Proceedings of the 2001 IEEE International Conference Acoustics, Speech, and Signal Processing vol. 2, May 7, 2001, pp. 749-752.

Sainath, et al., "Multichannel signal processing with deep neural networks for automatic speech recognition", In Journal of IEEE/ACM Transactions on Audio, Speech, and Language Processing, vol. 25, Issue 5, May 2017, pp. 965-979.

Seltzer, et al., "Likelihood-maximizing beamforming for robust hands-free speech recognition", In Journal of IEEE Transactions on Speech and Audio Processing vol. 12, Issue 5, Aug. 16, 2004, pp. 489-498.

Subramanian, et al., "Speech enhancement using end-to-end speech recognition objectives", In Proceedings of IEEE Workshop on Applications of Signal Processing to Audio and Acoustics, Oct. 20, 2019, pp. 234-238.

Taal, et al., "An Algorithm for Intelligibility Prediction of Time-Frequency Weighted Noisy Speech", In Journal of IEEE Transactions on Audio, Speech, and Language Processing, vol. 19, Issue 7, Sep. 2011, pp. 2125-2136.

Tang, et al., "Joint time-frequency and time domain learning for speech enhancement", In Proceedings of the 29th International Joint Conference on Artificial Intelligence, Jul. 2020, pp. 3816-3822.

Trabelsi, et al., "Deep complex networks", In Journal of Computing Research Repository, May 27, 2017, pp. 1-14.

Wang, et al., "Exploring end-to-end multi-channel asr with bias information for meeting transcription", In Repository of arXiv:2011.03110v2, Nov. 25, 2020, 8 Pages.

Watanabe, et al., "The 2020 espnet update: new features, broadened applications, performance improvements, and future plans", In Repository of arXiv:2012.13006v1, Dec. 23, 2020, 6 Pages.

Zhao, et al., "High-accuracy and low-latency speech recognition with two head contextual layer trajectory lstm model", In Proceedings of IEEE International Conference on Acoustics, Speech and Signal Processing, May 8, 2020, pp. 7699-7703.

Xiao, et al., "Deep beamforming networks for multi-channel speech recognition", In Proceedings of IEEE International Conference on Acoustics, Speech and Signal, Mar. 20, 2016, pp. 5745-5749.

(56) References Cited

OTHER PUBLICATIONS

Yin, et al., "Phasen: A phase-and-harmonics-aware speech enhancement network", In Proceedings of the 34th AAAI Conference on Artificial Intelligence, vol. 34, Issue 5, Apr. 2020, pp. 9458-9465.
Zhao, et al., "Convolutional-recurrent neural networks for speech enhancement", In Proceedings of IEEE Conference on Acoustics, Speech and Signal Processing, Apr. 15, 2018, pp. 2401-2405.
Kearns, et al., "Librivox: Free Public Domain Audiobooks" in Journal of Reference Reviews, vol. 28, Issue 1, Jan. 14, 2014, 1 Page.
Hu, et al., "DCCRN: Deep Complex Convolution Recurrent Network for Phase-Aware Speech Enhancement", In Repository of arXiv:2008.00264v1, Aug. 1, 2020, 5 Pages.
Ji, et al., "Speaker-Aware Target Speaker Enhancement by Jointly Learning with Speaker Embedding Extraction", In Proceedings of IEEE International Conference on Acoustics, Speech and Signal Processing, May 4, 2020, pp. 7294-7298.
Ochiai, et al., "Does speech enhancement work with end-to-end ASR objectives ?: Experimental analysis of multichannel end-to-end ASR", In Proceedings of IEEE International Workshop on Machine Learning for Signal Processing, Sep. 25, 2017, 6 Pages.
"International Search Report and Written Opinion Issued in PCT Application No. PCT/US22/026868", ddated Aug. 10, 2022, 11 Pages.
Xiao, et al., "On time-frequency mask estimation for mvdr beamforming with application in robust speech recognition", In Proceedings of IEEE International Conference on Acoustics, Speech and Signal Processing, Mar. 5, 2017, pp. 3246-3250.
Office Action Received for European Application No. 22724998.4, dated Jan. 9, 2024, 3 pages.

\* cited by examiner

SYSTEMS AND METHODS FOR HUMAN LISTENING AND LIVE CAPTIONING

BACKGROUND

People and organizations rely on digital technologies to stay connected and work, especially for remote work. With the surge of online meetings, it has become even more critical to provide high-quality speech audio and live captioning under various noise conditions. Speech enhancement (SE) systems are typically used to provide high-quality speech audios for listening participants in such online meetings by enhancing the audio for improved listening and understanding. SE machine learning models are typically trained to remove or suppress background noise and transmit the human speech to the listening party.

Conventional speech enhancement introduces artifacts into the enhanced audio and thus degrade the performance of live captioning (i.e., automatic speech recognition (ASR) for audio transcriptions). Thus, when noise-suppression is used on audio, the performance of online real-time captioning is degraded. Conventional approaches also use parallel simulated data (noisy and corresponding clean speech signals) to train the model. Simulated data limits the ability of the speech enhancement model to adapt to real-world situations.

In view of the foregoing, there is an ongoing need for improved systems and methods for generating training data and for training models, including the deployment of such models, for improved speech enhancement.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Disclosed embodiments include systems, methods and devices used for training machine learning models to generate noise-suppressed speech outputs that have been optimized for retaining signal quality and for producing corresponding speech transcriptions.

Some disclosed systems are configured to obtain both a speech enhancement model trained on a first training dataset to generate noise-suppressed speech outputs and an automatic speech recognition model trained on a second training dataset to generate transcription labels for spoken language utterances. The systems also apply a third training dataset that comprises a set of spoken language utterances to the speech enhancement model to obtain a first noise-suppressed speech output. Subsequently, the systems also apply the first noise-suppressed speech output from the speech enhancement model to the automatic speech recognition model to generate a noise-suppressed transcription output for the set of spoken language utterances.

Disclosed systems are also configured to obtain ground truth transcription labels for the set of spoken language utterances included in the third training dataset and to update one or more speech enhancement model parameters to optimize the speech enhancement model(s) to generate optimized noise-suppressed speech outputs based on a comparison of the noise-suppressed transcription output and the ground truth transcription labels.

Disclosed systems are configured to utilize multi-task training framework for facilitating speech enhancement. In such configurations, for example, systems are configured to first obtain or generate a speech enhancement model trained with a first training dataset to generate noise-suppressed speech outputs, as well as to obtain or generate an automatic speech recognition model trained with a second training dataset to generate transcription labels for spoken language utterances.

The systems also obtain or utilize a third training dataset comprising (i) a first data subset comprising a set of spoken language utterances and ground truth transcription labels corresponding to the set of spoken language utterances and (ii) a second data subset comprising noisy audio data and clean reference audio data corresponding to the noisy audio data. Then, the set of spoken language utterances included in the third training dataset is applied to the speech enhancement model to generate or obtain a first noise-suppressed speech output. Subsequently, the first noise-suppressed speech output from the speech enhancement model is applied to the automatic speech recognition model to generate a noise-suppressed transcription output for the set of spoken language utterances. The noisy audio data included in the third training dataset is also applied to the speech enhancement model to obtain a second noise-suppressed speech output.

Finally, the systems are further configured to update one or more speech enhancement model parameters to optimize the speech enhancement model to generate optimized noise-suppressed speech outputs based on (i) a first comparison of the noise-suppressed transcription output and the ground truth transcription labels to facilitate a first improvement in generating noise-suppressed transcription outputs and (ii) a second comparison of the second noise-suppressed speech output and the clean reference audio data to facilitate a second improvement in generating noise-suppressed speech outputs.

Disclosed systems are also configured to use an optimized speech enhancement model to generate noise-suppressed speech outputs and corresponding noise-suppressed speech transcriptions. In such configurations, the systems obtain electronic content comprising an audio stream comprising spoken language utterances. The systems also access a speech enhancement model that is trained on a first training dataset and optimized to generate optimized noise-suppressed speech outputs by updating one or more speech enhancement model parameters based on a first comparison of noise-suppressed transcription outputs obtained from applying noise-suppressed speech outputs to an automatic speech recognition model and ground truth transcription labels corresponding to the noise-suppressed speech outputs. Finally, the systems generate an optimized noise-suppressed speech output based on providing and/or applying a portion of the audio stream (as input) to the speech enhancement model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments are directed towards improved systems, methods and frameworks for training and utilizing machine learning models to perform optimized speech enhancement. The disclosed embodiments include systems and methods that are specifically configured to implement and perform joint or multi-task training of speech enhancement models to facilitate simultaneous human listening and live captioning.

More particularly, some of the disclosed embodiments are directed to improved training frameworks for optimizing deep learning based speech enhancement models for both improved audio communication and transcription quality by leveraging pre-trained ASR models. The disclosed frameworks are configured to build and/or utilize SE models that achieve superior ASR performance while retaining the same or better speech qualities as SE models trained only for SE objectives (i.e., retaining signal quality during audio enhancement).

The disclosed embodiments provide many technical advantages over existing systems, including the ability to leverage in-domain real-world noisy recordings which do not need the corresponding clean speech signals to optimize the SE network. This ability is very beneficial and can significantly improve the quality of live captioning, for example. The training data used by the disclosed systems comprises a mix of simulated and non-simulated audio data that can be further used to adapt SE models to particular applications, e.g., Microsoft's Teams video interfacing application.

Figure 1:
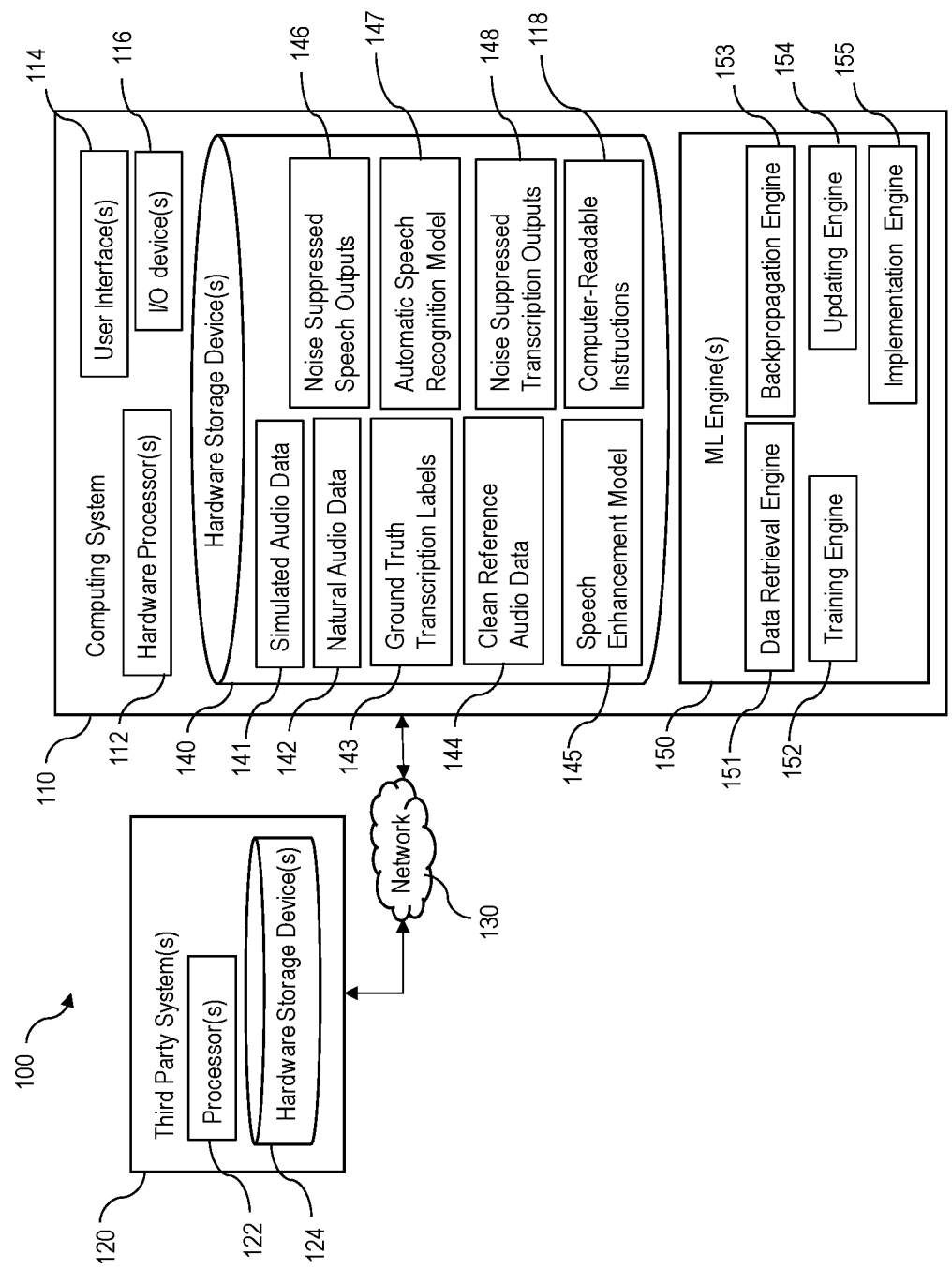
FIG. 1 illustrates a computing environment in which a computing system incorporates and/or is utilized to perform disclosed aspects of the disclosed embodiments.

Attention will now be directed to FIG. 1, which illustrates components of a computing system 110 which may include and/or be used to implement aspects of the disclosed invention. As shown, the computing system includes a plurality of machine learning (ML) engines, models, neural networks and data types associated with inputs and outputs of the machine learning engines and models.

Attention will be first directed to FIG. 1, which illustrates the computing system 110 as part of a computing environment 100 that also includes third-party system(s) 120 in communication (via a network 130) with the computing system 110. The computing system 110 is configured to train and optimize a speech enhancement model, along with an automatic speech recognition model to generate noise-suppressed speech outputs that are optimized for human listening and live captioning. The computing system 110 is also configured to operate machine learning models, including an optimized speech enhancement model.

The computing system 110, for example, includes one or more processor(s) (such as one or more hardware processor(s)) 112 and a storage (i.e., hardware storage device(s) 140) storing computer-readable instructions 118 wherein one or more of the hardware storage device(s) 140 is able to house any number of data types and any number of computer-readable instructions 118 by which the computing system 110 is configured to implement one or more aspects of the disclosed embodiments when the computer-readable instructions 118 are executed by the one or more processor(s) 112. The computing system 110 is also shown including user interface(s) 114 and input/output (I/O) device(s) 116.

As shown in FIG. 1, hardware storage device(s) 140 is shown as a single storage unit. However, it will be appreciated that the hardware storage device(s) 140 is, a distributed storage that is distributed to several separate and sometimes remote systems and/or third-party system(s) 120. The computing system 110 can also comprise a distributed system with one or more of the components of computing system 110 being maintained/run by different discrete systems that are remote from each other and that each perform different tasks. In some instances, a plurality of distributed systems performs similar and/or shared tasks for implementing the disclosed functionality, such as in a distributed cloud environment.

The hardware storage device(s) 140 are configured to store the different data types including simulated audio data 141, natural audio data 142, ground truth transcription labels 143, clean reference audio data 144, noise-suppressed speech output 146, and noise-suppressed transcription outputs 148, described herein.

The storage (e.g., hardware storage device(s) 140) includes computer-readable instructions 118 for instantiating or executing one or more of the models and/or engines shown in computing system 110 (e.g., speech enhancement model 145 and/or automatic speech recognition model 147). The models are configured as machine learning models or machine learned models, such as deep learning models and/or algorithms and/or neural networks. In some instances, the one or more models are configured as engines or processing systems (e.g., computing systems integrated within computing system 110), wherein each engine (i.e., model) comprises one or more processors (e.g., hardware processor(s) 112) and computer-readable instructions 118 corresponding to the computing system 110.

Simulated audio data 141 comprises a mixture of simulated clean speech (e.g., clean reference audio data 144) and one or more of: room impulse responses, isotropic noise, or ambient or transient noise for any particular actual or simulated environment. Thus, parallel clean audio data and noisy audio data is generated using the clean reference audio data 144 on the one hand, and a mixture of the clean reference audio data 144 and background noise data. Simulated noisy speech data is also generated by distorting the clean reference audio data 144.

Natural audio data 142 comprises spoken language utterances without a corresponding clean speech reference signal. Natural audio data 142 is recorded from a plurality of sources, including applications, meetings comprising one or more speakers, ambient environments including background noise and human speakers, etc.

Ground truth transcription labels 143 comprise phoneme labeling for audio data, in particular the natural audio data 142 and/or the simulated audio data 141. The ground truth transcription labels 143 are text transcriptions that correspond to spoken language utterances included in the natural audio data 142 or other audio data. The ground truth transcription labels 143 are obtained via human transcription or machine transcription (e.g., speech-to-text machine learning models).

Noise-suppressed speech outputs 146 comprise audio data that is obtained from a speech enhancement model. For example, when simulated audio data 141 and/or natural audio data 142 are applied to a speech enhancement model, any non-human speech is suppressed or removed to provide audio data or speech output that is enhanced (i.e., noise-suppressed). The present invention is directed to generating noise-suppressed speech outputs 146 that are optimized for generating noise-suppressed transcription outputs 148 that correspond to the noise-suppressed speech outputs 146. The noise-suppressed transcription outputs 148 comprise phoneme labeling or speech-to-text data for spoken language utterances included in the noise-suppressed speech outputs 146. The noise-suppressed transcription outputs 148 are used for live-captioning during automatic speech recognition and speech enhancement tasks.

An additional storage unit for storing machine learning (ML) Engine(s) 150 is presently shown in FIG. 1 as storing a plurality of machine learning models and/or engines. For example, computing system 110 comprises one or more of the following: a data retrieval engine 151, a training engine 152, a backpropagation engine 153, an updating engine 154, and an implementation engine 155, which are individually and/or collectively configured to implement the different functionality described herein.

For example, the data retrieval engine 151 is configured to locate and access data sources, databases, and/or storage devices comprising one or more data types from which the data retrieval engine 151 can extract sets or subsets of data to be used as training data. The data retrieval engine 151 receives data from the databases and/or hardware storage devices, wherein the data retrieval engine 151 is configured to reformat or otherwise augment the received data to be used as training data. Additionally, or alternatively, the data retrieval engine 151 is in communication with one or more remote systems (e.g., third-party system(s) 120) comprising third-party datasets and/or data sources. In some instances, these data sources comprise visual services that record or stream text, images, and/or video.

The data retrieval engine 151 accesses electronic content comprising simulated audio data 141, natural audio data 142, ground truth transcription labels 143, clean reference audio data 144, noise-suppressed speech output 146, and noise-suppressed transcription outputs 148 and/or other types of audio-visual data including video data, image data, holographic data, 3-D image data, etc. The data retrieval engine 151 is a smart engine that is able to learn optimal dataset extraction processes to provide a sufficient amount of data in a timely manner as well as retrieve data that is most applicable to the desired applications for which the machine learning models/engines will be trained. For example, the data retrieval engine 151 can learn which databases and/or datasets will generate training data that will train a model (e.g., for a specific query or specific task) to increase accuracy, efficiency, and efficacy of that model in the desired audio data processing techniques.

The data retrieval engine 151 locates, selects, and/or stores raw recorded source data wherein the data retrieval engine 151 is in communication with one or more other ML engine(s) and/or models included in computing system 110. In such instances, the other engines in communication with the data retrieval engine 151 are able to receive data that has been retrieved (i.e., extracted, pulled, etc.) from one or more data sources such that the received data is further augmented and/or applied to downstream processes. For example, the data retrieval engine 151 is in communication with the training engine 152 and/or implementation engine 155.

The data retrieval engine 151 is configured to retrieve training datasets comprising simulated audio data (i.e., a mixture of clean speech and room impulse responses, isotropic noise, or transient noise), non-simulated audio data including spoken language utterances without corresponding clean speech reference signals, speech data for a target domain corresponding to a target enterprise, a target speaking context, or a particular target user.

The training engine 152 is in communication with one or more of the data retrieval engine 151, the backpropagation engine 153, updating engine 154, or the implementation engine 155. In such embodiments, the training engine 152 is configured to receive one or more sets of training data from the data retrieval engine 151. After receiving training data relevant to a particular application or task, the training engine 152 trains one or more models on the training data. The training engine 152 is configured to train a model via unsupervised training and/or supervised training. The training engine 152 is configured to train one or more machine learning models various datasets, including simulated audio data 141 and natural audio data 142.

The training engine 152 is configured to train a speech enhancement model on a training dataset comprising simulated parallel noisy and clean audio data to generate noise-suppressed speech outputs and train an automatic speech recognition model on a training dataset comprising simulated and/or natural audio data and corresponding ground truth transcription labels to generate transcription labels for spoken language utterances included in the simulated and/or natural audio data. The training engine 152 is also configured to apply a training dataset comprising a set of spoken language utterances to the speech enhancement model to obtain a noise-suppressed speech output. The training engine 152 also trains the speech enhancement model on a training dataset comprising noisy audio data and clean reference audio data to minimize the signal quality loss during generation of the optimized noise-suppressed speech outputs.

The backpropagation engine 153 is configured to perform backpropagation of the cross-entropy loss to the speech enhancement model 145 based on a comparison of the noise-suppressed transcription outputs 148 and the ground truth transcription labels 143. The cross-entropy loss is also calculated based on one or more labeling errors identified in the noise-suppressed transcription outputs 148. The backpropagation engine 153 is also configured to perform backpropagation of the phase-aware loss based on a comparison of the noise-suppressed speech outputs 146 and the clean reference audio data 144 corresponding to the noisy audio data used to obtain the noise-suppressed speech outputs 146.

The updating engine 154 is configured to update one or more speech enhancement model parameters to optimize the speech enhancement model to generate optimized noise-suppressed speech outputs that retain signal quality and produce optimized noise-suppressed transcription outputs when applied to an automatic speech recognition model 147. The updating engine 154 is configured to update one or more speech enhancement model parameters based on a comparison of the noise-suppressed transcription outputs 148 and the ground truth transcription labels 143. The updating engine 154 minimizes the signal quality loss during generation of the optimized noise-suppressed speech outputs based on a comparison of the noise-suppressed speech outputs 146 and clean reference audio data 144.

The updating engine 154 is configured to update one or more speech enhancement model parameters by adjusting a probability parameter corresponding to a frequency at which the speech enhancement model is updated. The probability parameter also determines whether the phase-aware loss or the cross-entropy loss is backpropagated to facilitate the updating of the speech enhancement model parameters. The one or more speech enhancement model parameters are also updated to optimize (i) a word error rate of the noise-suppressed transcription outputs and (ii) a mean opinion score of the noise-suppressed speech outputs.

As part of the joint-training framework, the one or more speech enhancement model parameters are updated by identifying one or more labeling errors in the noise-suppressed transcription outputs, calculating a cross-entropy loss based on the one or more labeling errors identified in the noise-suppressed transcription outputs, performing a backpropagation of the cross-entropy loss to the speech enhancement model, the one or more speech enhancement model parameters being updated to optimize the noise-suppressed speech outputs to minimize an occurrence of labeling errors in the noise-suppressed transcription outputs, calculating a phase-aware loss based on a second comparison of noise-suppressed speech outputs and clean reference audio data corresponding to noisy audio data used to obtain the noise-suppressed speech outputs, and performing a backpropagation of the phase-aware loss to the speech enhancement model, the one or more speech enhancement model parameters being updated to optimize the noise-suppressed speech outputs to minimize a signal quality loss in the noise-suppressed speech outputs.

The updating engine 154 is also configured to freeze a set of internal layers of the automatic speech recognition model prior to updating the speech enhancement model. After obtaining the speech enhancement model and the automatic speech recognition model, but prior to updating the speech enhancement model parameters, the updating engine 154 is configured to concatenate the trained speech enhancement model and the trained automatic speech recognition model.

The computing system 110 includes an implementation engine 155 in communication with any one of the models and/or ML engine(s) 150 (or all of the models/engines) included in the computing system 110 such that the implementation engine 155 is configured to implement, initiate or run one or more functions of the plurality of ML engine(s) 150. In one example, the implementation engine 155 is configured to operate the data retrieval engines 151 so that the data retrieval engine 151 retrieves data at the appropriate time to be able to generate training data for the training engine 152. The implementation engine 155 facilitates the process communication and timing of communication between one or more of the ML engine(s) 150 and is configured to implement and operate a machine learning model (or one or more of the ML engine(s) 150) which is configured as a speech enhancement model 145.

The implementation engine 155 is configured to operate a speech enhancement model to generate optimized noise-suppressed speech output based on an input audio stream and operate an automatic speech recognition model to generate an optimized noise-suppressed transcription output based on the optimized noise-suppressed speech output from the speech enhancement model.

In some instances, the speech enhancement model 145 is configured as a personalized speech enhancement model. While speech enhancement models are trained to remove background noise and keep only the human speech from a noisy audio signal, when there is more than one speaker, unconditional models keep all the speaker's voices. To prevent leaking of sensitive material transmitted over the audio and/or to keep only one or a select few of the speakers, the speech enhancement model is configurable to keep speech from one or more target speakers.

A speaker embedding vector is extracted from a user's enrollment data and used to lock onto the user's voice and filter all other audio sources. In a first stage, a speaker identification/verification model is used to extract the embedding vector of the target speaker and used as a condition to the SE systems. For example, the embedding vector is appended to an internal layer input of the SE model by mapping the tensor shape of the embedding vector to the particular internal layer. The seed SE model is trained to be speaker independent initially, wherein only 4 to 60 seconds of audio from the target speaker is required to achieve the personalization. Multiple embedding vectors for multiple target speakers can be appended to the SE model such that the SE model retains human speech from the multiple target speakers. With regard to the foregoing, it will be appreciated that different types of speech enhancement models can also be used, as well as customized models, to provide the desired speech enhancement results. In other words, the described multi-task training can be applied to all kinds of neural network-based speech enhancement models.

The computing system is in communication with third-party system(s) 120 comprising one or more processor(s) 122, one or more of the computer-readable instructions 118, and one or more hardware storage device(s) 124. It is anticipated that, in some instances, the third-party system(s) 120 further comprise databases housing data that could be used as training data, for example, audio data not included in local storage. Additionally, or alternatively, the third-party system(s) 120 include machine learning systems external to the computing system 110. The third-party system(s) 120 are software programs or applications.

Figure 2:
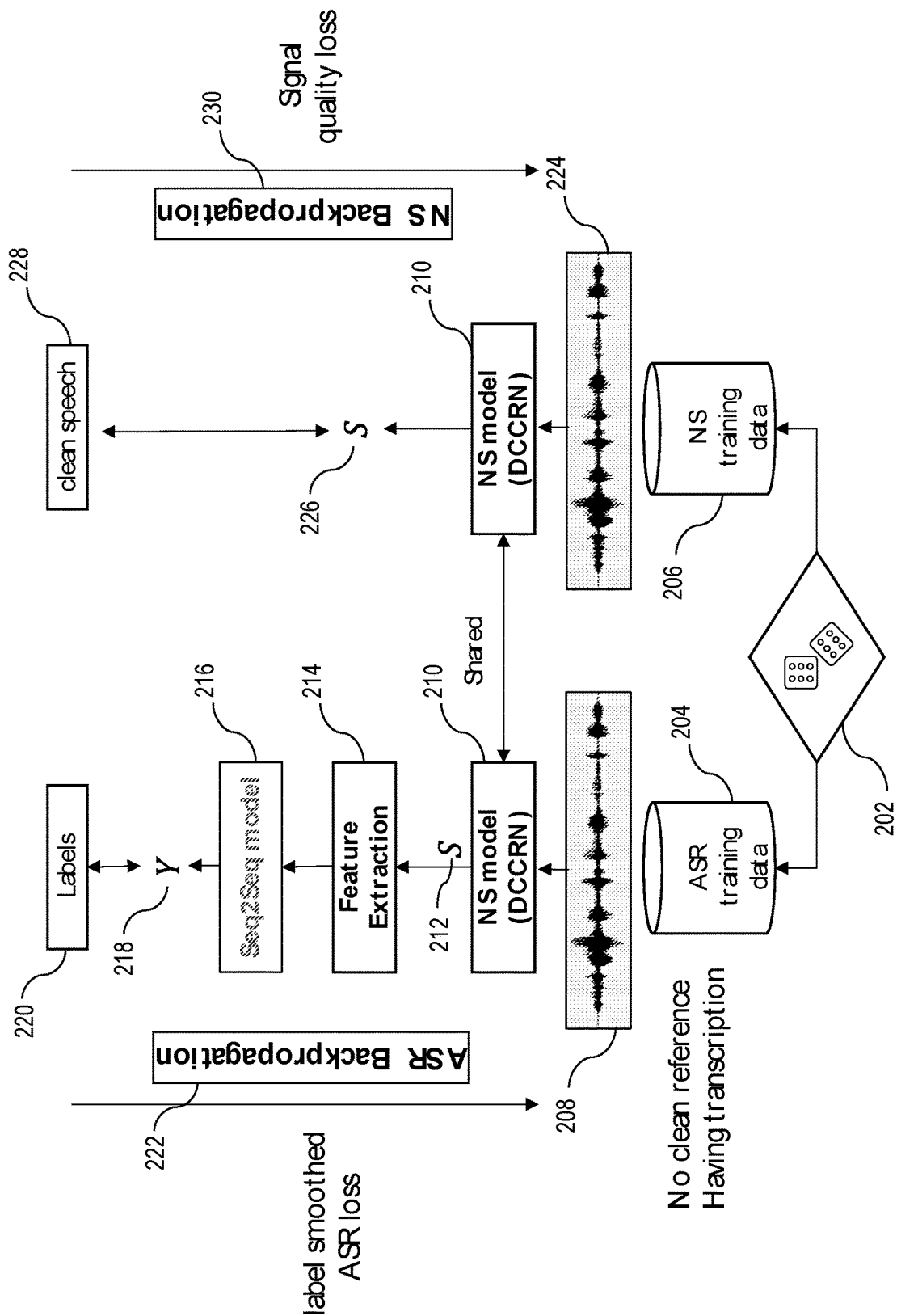
FIG. 2 illustrates an example embodiment for training machine learning models for improved speech enhancement and speech recognition.

Attention will now be directed to FIG. 2, in some reference to FIG. 1, which illustrates an example embodiment for training machine learning models for improved speech enhancement and speech recognition. FIG. 2 shows the probability parameter 202 which determines the type and frequency of each training iteration using either ASR training data 204 or NS training data 206. The ASR training data 204 comprises natural audio data 142 and ground truth transcription labels 143, without clean reference audio data 144. Input audio data 208 is applied to the speech enhancement or noise-suppression model (e.g., NS model 210) which produces "S" output 212. A feature extraction 214 is applied to "S" output 212 prior to being used as input to the ASR model (e.g., Seq2Seq model 216) which produces "Y" output 218. "Y" output is used to generate labels 220 for spoken language utterances includes in the input audio data 208.

Based on a cross-entropy loss calculated from a comparison of the ASR training data 204 and the labels 220, the system performs ASR loss backpropagation 222 to update one or more parameters corresponding to the NS model 210 to improve the word error rate of the labels 220. During the ASR backpropagation 222, a set of internal layers of the Seq2Seq model 216 are frozen, such that only the NS model 210 is updated. The Seq2Seq model 216 is previously trained on ASR training data 204 to perform speech recognition and generate transcription labels for input audio data.

The NS training data 206 comprises simulated parallel noisy and clean speech audio data without ground truth transcription labels. Input audio 224 is applied to the NS model 210 (which is shared between the ASR and NS training iterations) to produce "S" output 226 which is configured as clean speech 228 (i.e., enhanced and/or noise-suppressed speech output). Based on a comparison of the clean speech 228 and the NS training data 206, the system performs NS loss backpropagation 230 to update one or more parameters of the NS model 210 to minimize signal quality loss. In either the ASR or NS training iterations, the NS model 210 is previously trained on NS training data 206 to generate noise-suppressed speech outputs.

Alternating between the ASR training and NS training iteration steps, the NS model 210 is simultaneously optimized to generate optimized noise-suppressed speech outputs that retain signal quality during noise-suppression for improved human listening and live-captioning (e.g., automatic speech recognition tasks). For the NS training iteration step, clean speech and noisy speech samples are mixed and paired to evaluate a signal difference-based loss function. The SE model parameter gradients with respect to this loss function are computed to update the speech enhancement model parameters (e.g., layers of the NS model 210).

During the ASR training iteration step, noisy training samples in a mini batch are fed to the SE network (e.g., NS model 210). The generated enhanced signals are input to the ASR network (e.g., Seq2Seq model 216). A loss function is evaluated by comparing the ASR model output and the reference transcriptions. The loss is backpropagated all the way down to the SE network, and only the SE model parameters are updated. The objective is to find SE model parameter values that work for existing well-trained ASR systems; thus, the ASR network should not be adapted to the characteristics of the SE model.

This multi-task approach beneficially provides the advantage of using real noisy speech samples that only need reference transcriptions for the SE model training. At each training iteration step, the update step to be used is chosen randomly from a Bernoulli distribution. The probability of choosing the SE-step is the "SE-step probability." The probability parameter 202 is the parameter that determines the frequency and timing of each iteration step. Attention will now be directed to FIG. 3, which illustrates a novel embodiment of an exemplary speech enhancement model framework. It will be appreciated that the speech enhancement model trained and operated in methods and systems described herein is configured as a DCCRN model (as shown in FIG. 3), a PNS, DCUNET, or any other seed or customized models.

Figure 3:
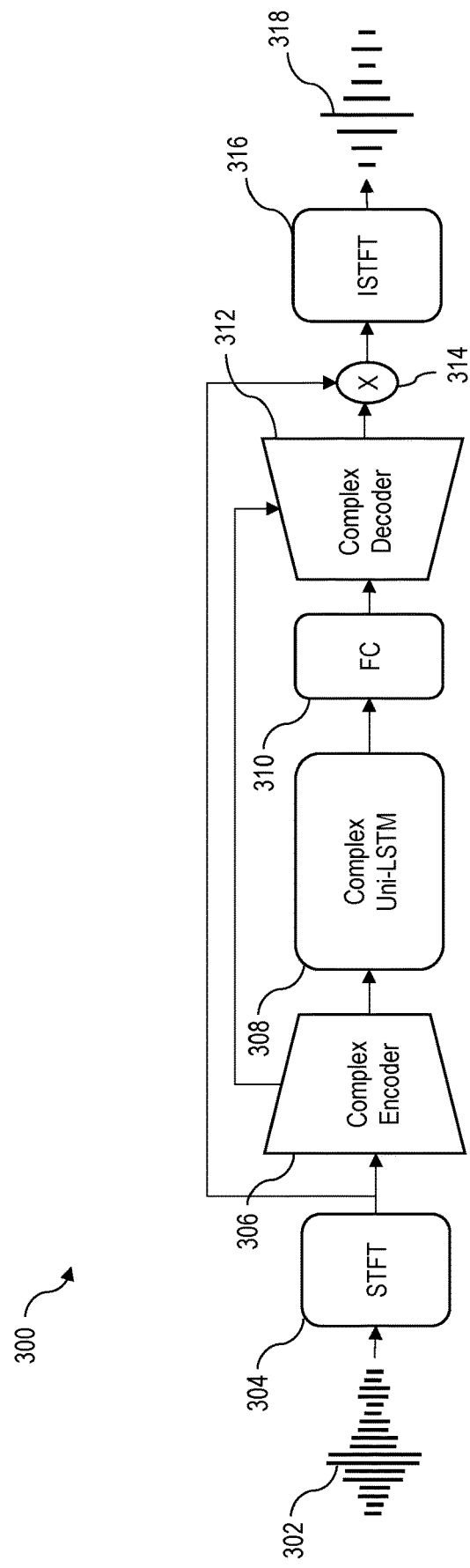
FIG. 3 illustrates a novel embodiment of an exemplary speech enhancement model framework.

FIG. 3 shows an exemplary speech enhancement model (e.g., NS model 210) configured as a DCCRN model 300 including a real short time Fourier transform layer (STFT 304), a complex encoder layer 306, a complex unified long short term memory layer (Complex Uni-LSTM layer 308), an FC layer 310, a complex decoder layer 312, a concatenation layer 314, and an imaginary short time Fourier transform layer (ISTFT 316).

The DCCRN model 300 is configured to take noisy input audio 302 and generate noise-suppressed output audio 318. As shown in FIG. 3, the DCCRN model 300 takes the real and imaginary parts of a noisy spectrum as input and estimates a complex ratio mask and applies it to the noisy speech. The masked signal is converted back to the time domain with the ISTFT 316.

Figure 4:
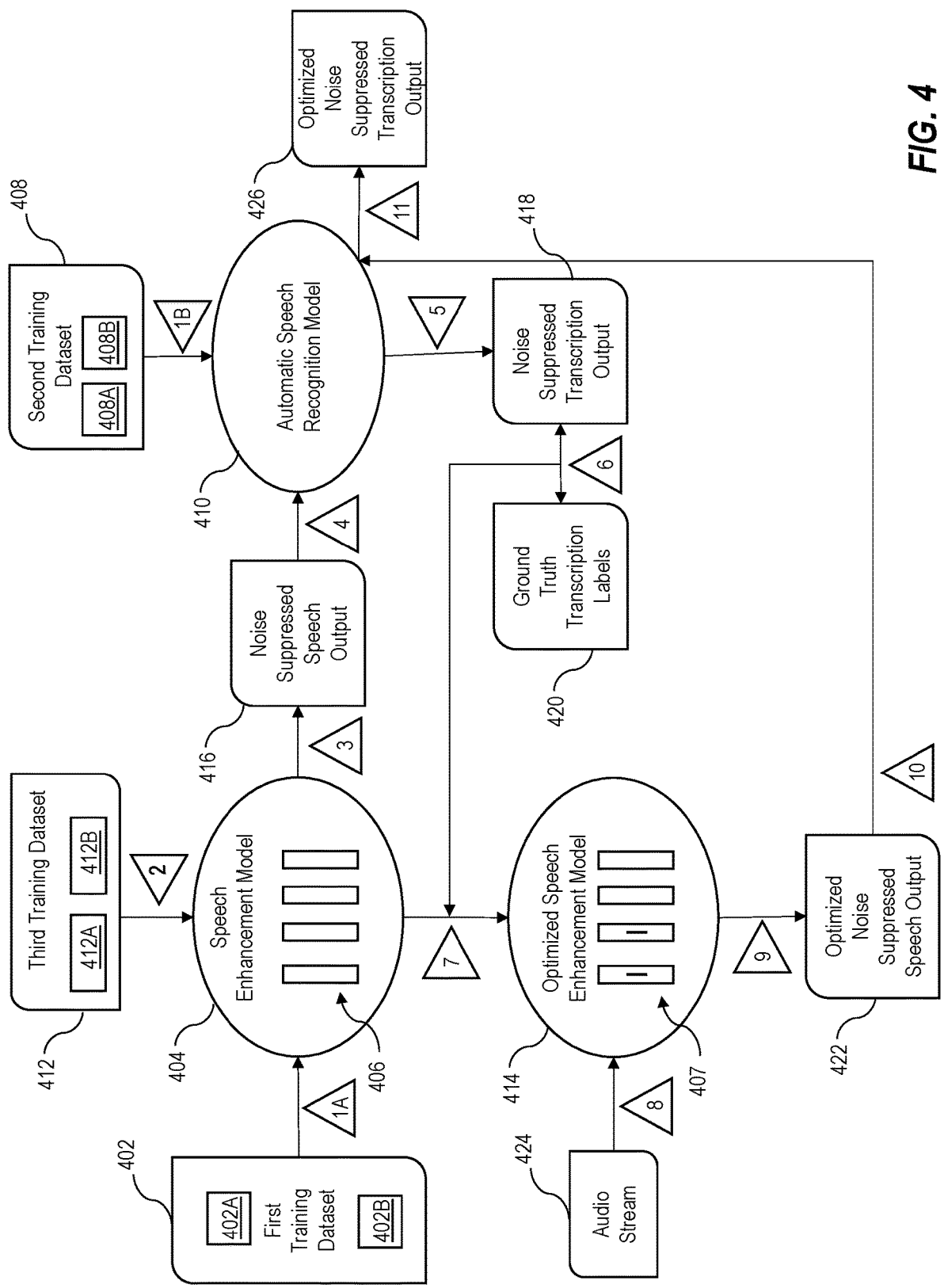
FIG. 4 illustrates a novel embodiment of a process flow diagram for generating an optimized speech enhancement model.

Attention will now be directed to FIG. 4, with some reference to FIGS. 1 and 2, which illustrates a novel embodiment of a process flow diagram for generating an optimized speech enhancement model.

A first training dataset 402 (e.g., NS training data 206) is used to train (see step 1A) the speech enhancement model 404 having a plurality of speech enhancement model parameters 406 to generate noise-suppressed speech outputs. The first training dataset 402 comprises a large-scale and high-quality simulated dataset, which includes around 1,000 hours of paired noisy and clean speech samples. The mixtures are created from using non-stationary noise recordings, internal noise recordings, and colored stationary noise as noise sources. In addition, the clean speech in each mixture is convolved with acoustic room impulse response (RIR) sampled from measured and simulated responses.

A second training dataset 408 (e.g., ASR training data 204) is used to train (see step 1B) an automatic speech recognition model 410 to generate transcription outputs for spoken language utterances included in input audio. The second training dataset 408 comprises anonymized and transcribed spoken language utterances, totally 75,000 hours. It should be appreciated that any amount sufficient to effectively train the ASR model may be used.

A third training dataset 412 is used to train the speech enhancement model 404 to generate an optimized speech enhancement model 414 by performing alternating training iterations using the third training data subset 412A and the third training data subset 412B. Third training data subset 412A comprises noisy natural (and/or simulated) audio data and corresponding ground truth transcription labels without corresponding clean reference audio data. The third training data subset 412A comprises one or more subsets (e.g., subset 408A and/or subset 408B) of the second training dataset 408. The particular subsets to be included in the third training dataset 412 are selected, in part, based on criteria such as in-domain vs. out-of-domain and including vs. excluding simulated data. The simulated data included in the first training dataset for the SE training is different from the simulated/augmented data included in the second training dataset for the ASR training.

Third training data subset 412B comprises parallel noisy and clean audio data. This is simulated audio data because strict alignment is required between the parallel noisy and clean audio data for effective training of the speech enhancement model to minimize signal quality loss. The third training data subset 412B comprises one or more subsets (e.g., subset 402A and/or subset 402B) of the first training dataset 402. The third training data subset 412B is used to update one or more of the speech enhancement model parameters 406 (e.g., see updated speech enhancement model parameters 407) such that the optimized speech enhancement model 414 is configured to generate optimized noise-suppressed speech outputs that are optimized for signal quality retention, as well as optimized downstream ASR tasks which are described below.

The third training dataset 412 (or more specifically, third training data subset 412A) comprises a set of spoken language utterances which are applied (see step 2) to the speech enhancement model 404 to obtain (see step 3) a noise-suppressed speech output 416. The noise-suppressed speech output 416 is applied (see step 4) to the automatic speech recognition model 410 to generate (see step 5) a noise-suppressed transcription output 418. Ground truth transcription labels 420 are obtained for the set of spoken language utterances included in the third training data subset 412A. The noise-suppressed transcription output 418 is compared (see step 6) against the ground truth transcription labels 420. From this comparison, a cross-entropy loss is calculated and backpropagated to the speech enhancement model 404. The automatic speech recognition model is frozen to prevent the cross-entropy loss backpropagation from updating the automatic speech recognition model 410.

Based on this comparison, one or more of the speech enhancement model parameters 406 are updated to optimize the speech enhancement model 404 in order to generate (see step 7) an optimized speech enhancement model 414. The optimized speech enhancement model 414 is configured to generate (see step 9) optimized noise-suppressed speech outputs 422 based on an input audio stream 424 which can subsequently be applied (see step 10) to the automatic speech recognition model 410 to generate optimized noise-suppressed transcription outputs 426 (see step 11).

Figure 5:
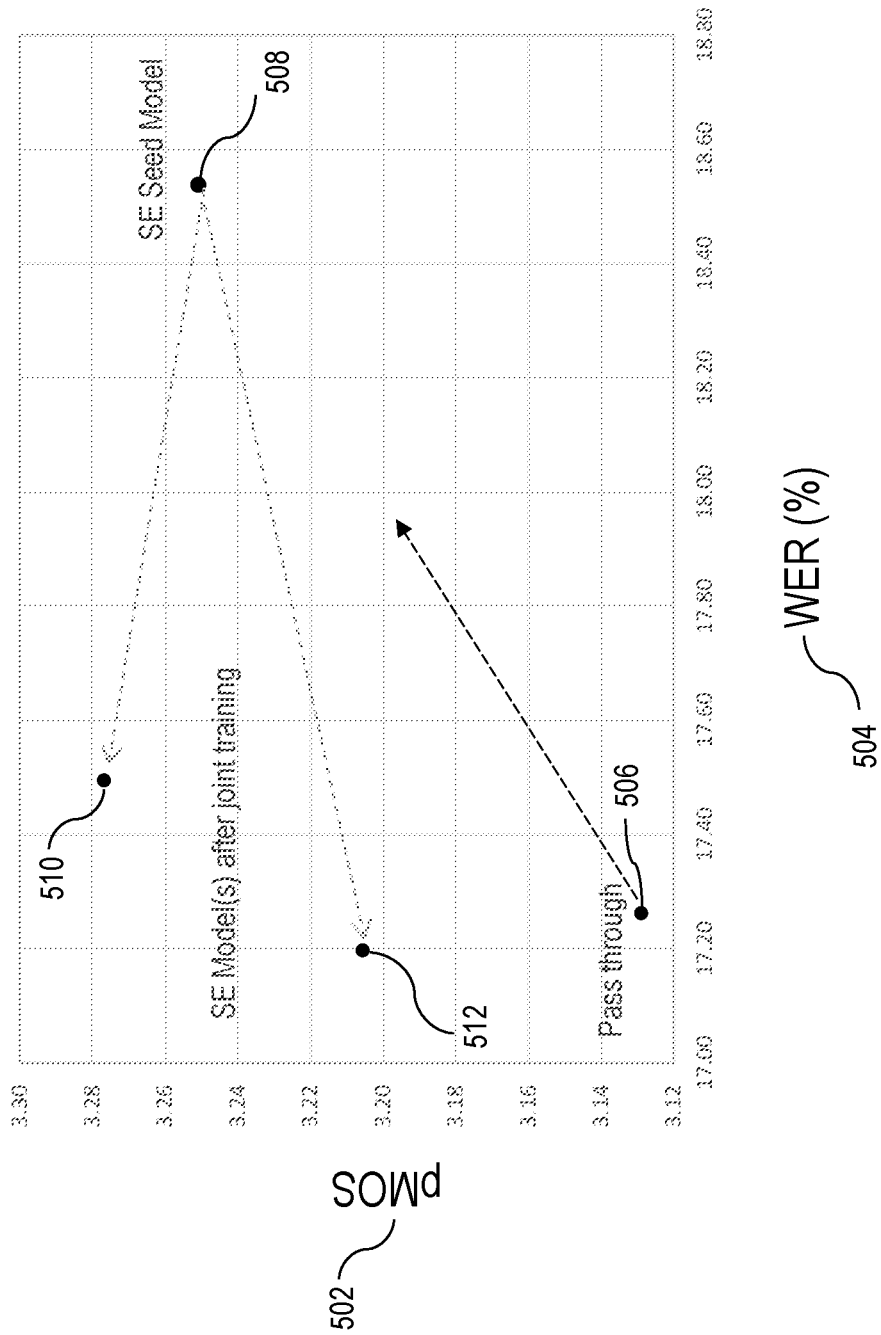
FIG. 5 illustrates a graph showing improvements in a speech enhancement model after employing disclosed training methods.

Attention will now be directed to FIG. 5, which illustrates a graph showing improvements in a speech enhancement model after employing disclosed training methods. The optimized speech enhancement model is evaluated using both simulated and real test data and using various evaluation techniques including PESQ, STOI, SDR, and pMOS metrics. Specifically, as referenced in FIG. 5, pMOS 502 is a neural network based non-intrusive MOS (mean opinion score) estimator that shows high correlations with human MOS ratings without requiring reference signals.

FIG. 5 shows various evaluation ratings for seed SE models and their multi-task trained versions for simulated and real recordings graphed based on the pMOS score and the ASR performance (measured by word error rate percentage, i.e., WER % score 504). During an initial passthrough 506 of the audio data, the ASR performance yielded a low WER % which is desirable, but a low pMOS score which is undesirable. To improve the pMOS score, the audio was processed by the SE seed model 508. However, while the pMOS score was raised significantly with this SE seed model 508, the SE seed model 508 was degraded in that the ASR performance also resulted in a relatively higher WER %.

After training with methods such as those disclosed herein (e.g., the multi-task training), the audio processed by an optimized SE model (e.g., SE Model 510 and/or SE model 512) was found to have a significantly improved WER % as compared to the SE seed model 508, while also having a relatively higher pMOS score. In some instances, in the audio processed by SE model 512, the pMOS score was degraded slightly, while also lowering the WER %, thus showing a trade-off between the ASR and SE quality.

Accordingly, it will be appreciated that it is possible to implement different modifications and multi-task training optimizations, as desired, by adjusting the SE-step probability based on different application needs. For instance, performing the ASR-step more frequently will result in ASR performance improvement at the expense of pMOS scores compared to the SE Seed model, whereas a moderate SE-step probability is optimal for serving both human listening and live captioning tasks.

The foregoing results also show that the stronger ASR back-end models used for generating the optimized SE models are more effective in closing the WER gap while preserving the SE improvement. It should be noted that a strong ASR model is trained on natural audio data training datasets described herein, along with training datasets including clean signals. The mixture of simulated and natural audio data provides beneficial acoustic diversity in terms of noise and reverberation conditions. A mixture of in-domain and out-of-domain data also led to improved WER % scores.

Figure 6:
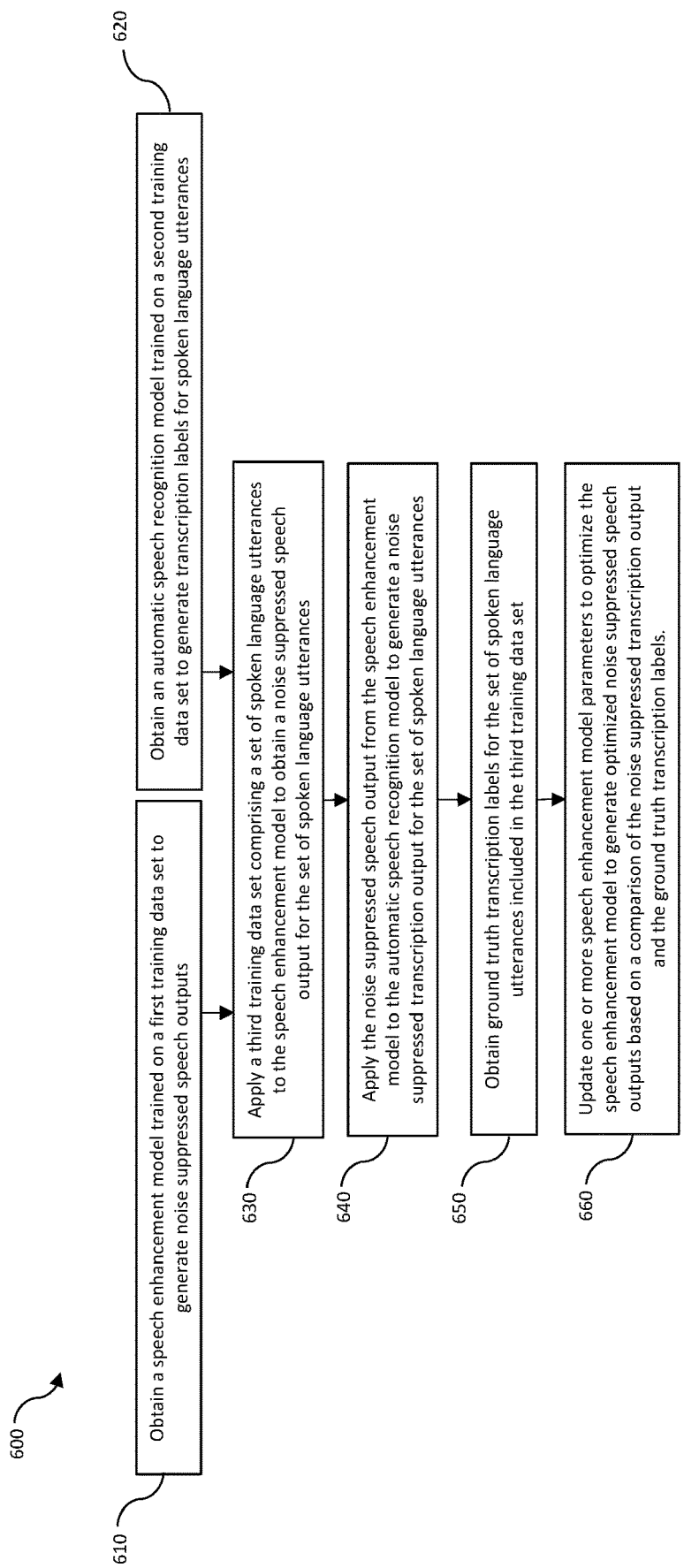
FIG. 6 illustrates one embodiment of a flow diagram having a plurality of acts for generating an optimized speech enhancement model.

Attention will now be directed to FIG. 6 which illustrates a flow diagram 600 that includes various acts (act 610, act 620, act 630, act 640, act 650, and act 660) associated with exemplary methods that can be implemented by computing system 110 for obtaining training data, training, and updating a machine learning model for optimizing a speech enhancement model.

The first illustrated act includes an act of obtaining a speech enhancement model trained on a first training dataset to generate noise-suppressed speech outputs (act 610). The computing system also obtains an automatic speech recognition model trained on a second training dataset to generate transcription labels for spoken language utterances (act 620). A third training dataset comprising a set of spoken language utterances is applied to the speech enhancement model to obtain a first noise-suppressed speech output (act 630). Subsequently, the first noise-suppressed speech output from the speech enhancement model to the automatic speech recognition model to generate a noise-suppressed transcription output for the set of spoken language utterances (act 640).

The computing system obtains ground truth transcription labels for the set of spoken language utterances included in the third training dataset (act 650). Finally, one or more speech enhancement model parameters are updated to optimize the speech enhancement model to generate optimized noise-suppressed speech outputs based on a first comparison of the noise-suppressed transcription output and the ground truth transcription labels (act 660).

Prior to updating the one or more speech enhancement model parameters, freezing a set of internal layers of the automatic speech recognition model.

After obtaining the speech enhancement model and the automatic speech recognition model but prior to updating the one or more speech enhancement model parameters, concatenating the speech enhancement model and the automatic speech recognition model.

The computing system also obtains a fourth training dataset comprising noisy audio data and clean reference audio data corresponding to the noisy audio data, applies the noisy audio data to the speech enhancement model to obtain a second noise-suppressed speech output, and updates the one or more speech enhancement model parameters to minimize signal quality loss during generation of the optimized noise-suppressed speech outputs based on a second comparison of the second noise-suppressed speech output and the clean reference audio data. The fourth training dataset comprises a subset of the first training dataset.

The computing system is also configured to obtain user enrollment data comprising a speaker embedding vector corresponding to a target speaker, extract the speaker embedding vector corresponding to the target speaker, and personalize the speech enhancement model to the target speaker by appending the speaker embedding vector to an internal layer of the speech enhancement model to configure the speech enhancement model to remove background noise and non-target speaker speech in order to generate personalized noise-suppressed speech outputs.

The speech enhancement model configured as a deep complex convolution recurrent network for phase-aware speech enhancement comprising one or more short time Fourier transform layers, a complex. The automatic speech recognition model configured as a sequence-to-sequence model using an attention-based encoder-decoder structure.

The first training dataset comprising simulated data comprising a mixture of clean speech and one or more of: room impulse responses, isotropic noise, or transient noise. the second training dataset comprising non-simulated audio data comprising spoken language utterances without a corresponding clean speech reference signal. Alternatively, the second training dataset comprising non-simulated audio data and simulated audio data. The third training dataset comprising a sub-set of the second training dataset. The third training dataset comprising speech data for a target domain corresponding to one or more of: a target enterprise or a target speaking context, or a particular target user.

The computing system is configured to update the one or more speech enhancement model parameters by adjusting a probability parameter corresponding to a frequency at which the speech enhancement model is updated. Additionally, the computing system is configured to update the one or more speech enhancement model parameters to optimize (i) a word error rate of the noise-suppressed transcription output and (ii) a mean opinion score of the first noise-suppressed speech output.

Figure 7:
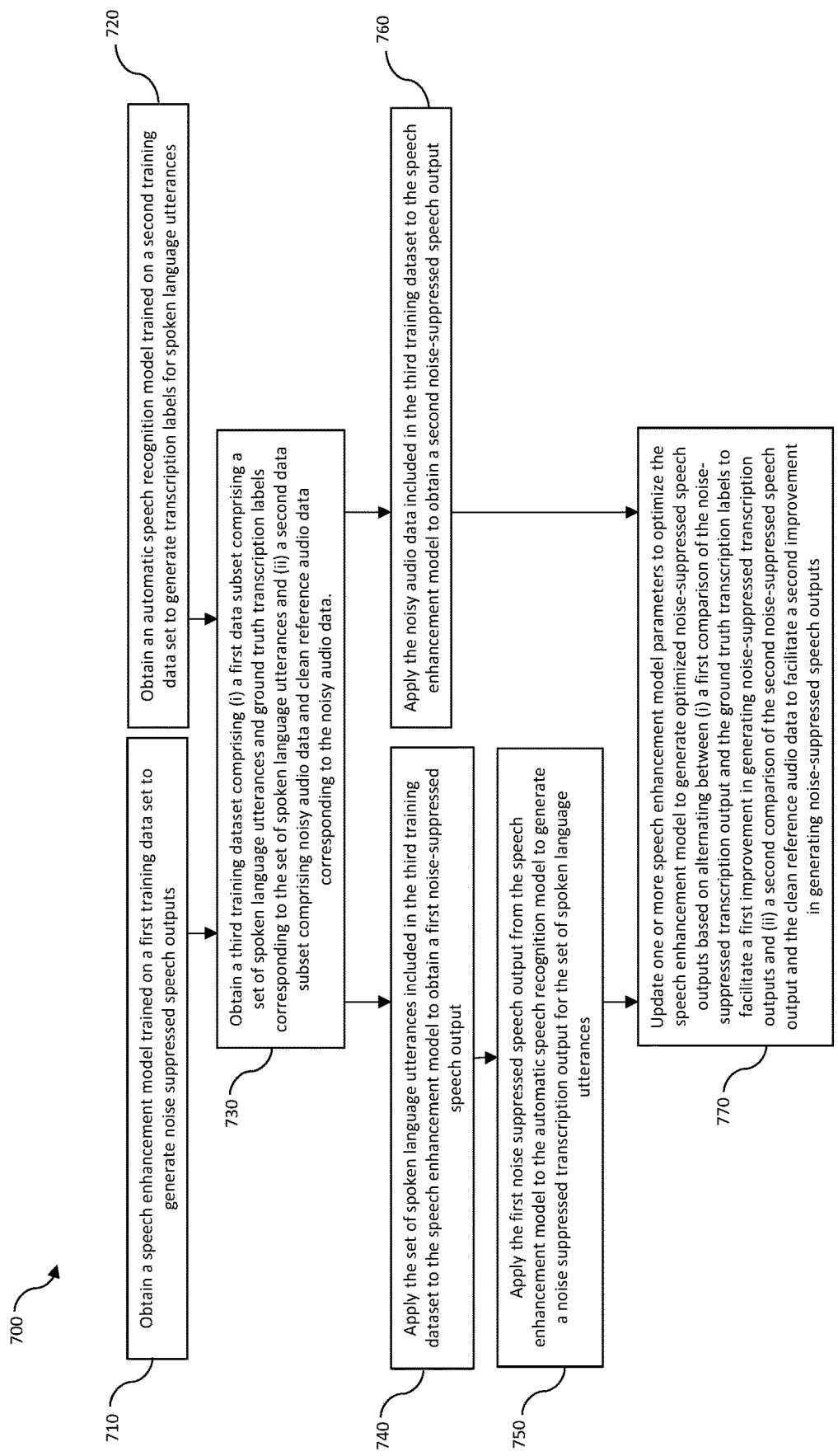
FIG. 7 illustrates another embodiment of a flow diagram having a plurality of acts for joint training a machine learning model for speech enhancement and speech recognition.

Attention will now be directed to FIG. 7 which illustrates a flow diagram 700 that includes various acts (act 710, act 720, act 730, act 740, act 750, act 760, and act 770) associated with exemplary methods that can be implemented by computing system 110 for obtaining training data and training a machine learning model for updating a speech enhancement model.

The first illustrated act includes an act of obtaining a speech enhancement model trained on a first training dataset to generate noise-suppressed speech outputs (act 710). The computing system also obtains an automatic speech recognition model trained on a second training dataset to generate transcription labels for spoken language utterances (act 720) and obtains a third training dataset comprising (i) a first data subset comprising a set of spoken language utterances and ground truth transcription labels corresponding to the set of spoken language utterances and (ii) a second data subset comprising noisy audio data and clean reference audio data corresponding to the noisy audio data (act 730).

The set of spoken language utterances included in the third training dataset is applied to the speech enhancement model to obtain a first noise-suppressed speech output (act 740) which is then applied to the automatic speech recognition model to generate a noise-suppressed transcription output for the set of spoken language utterances (act 750). The computing system also applies the noisy audio data included in the third training dataset to the speech enhancement model to obtain a second noise-suppressed speech output (act 760).

Finally, the computing system updates one or more speech enhancement model parameters to optimize the speech enhancement model to generate optimized noise-suppressed speech outputs based on alternating between (i) a first comparison of the noise-suppressed transcription output and the ground truth transcription labels to facilitate a first improvement in generating noise-suppressed transcription outputs and (ii) a second comparison of the second noise-suppressed speech output and the clean reference audio data to facilitate a second improvement in generating noise-suppressed speech outputs (act 770).

Figure 8:
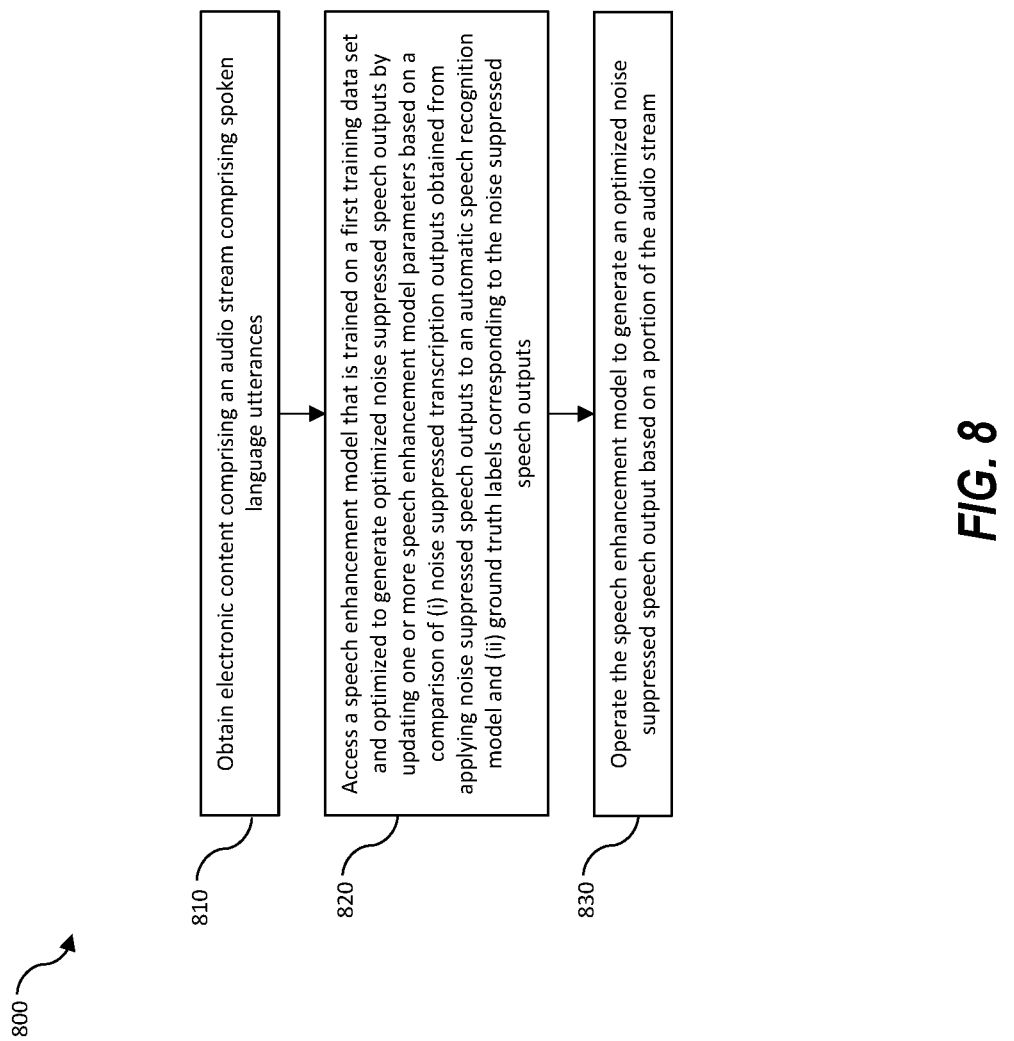
FIG. 8 illustrates one embodiment of a flow diagram having a plurality of acts for operating an optimized speech enhancement model.

Attention will now be directed to FIG. 8 which illustrates a flow diagram 800 that includes various acts (act 810, act 820, and act 830) associated with exemplary methods that can be implemented by computing system 110 for obtaining training data and training a machine learning model for updating a speech enhancement model.

The first illustrated act includes an act of obtaining electronic content comprising an audio stream comprising spoken language utterances (act 810). The computing system then accesses a speech enhancement model that is trained on a first training dataset and optimized to generate optimized noise-suppressed speech outputs by updating one or more speech enhancement model parameters based on a first comparison of noise-suppressed transcription outputs obtained from applying noise-suppressed speech outputs to an automatic speech recognition model and ground truth transcription labels corresponding to the noise-suppressed speech outputs (act 820). Subsequently, the computing system operates the speech enhancement model to generate an optimized noise-suppressed speech output based on a portion of the audio stream (act 830).

The computing system also accesses the automatic speech recognition model that is trained on a second training dataset to generate transcription labels for spoken language utterances and operates the automatic speech recognition model to generate an optimized noise-suppressed transcription output based on the optimized noise-suppressed speech output from the speech enhancement model.

The one or more speech enhancement model parameters are updated by identifying one or more labeling errors in the noise-suppressed transcription outputs, calculating a cross-entropy loss based on the one or more labeling errors identified in the noise-suppressed transcription outputs, and performing a backpropagation of the cross-entropy loss to the speech enhancement model, the one or more speech enhancement model parameters being updated to optimize the noise-suppressed speech outputs to minimize an occurrence of labeling errors in the noise-suppressed transcription outputs.

The parameters are also updated by calculating a phase-aware loss based on a second comparison of noise-suppressed speech outputs and clean reference audio data corresponding to noisy audio data used to obtain the noise-suppressed speech outputs and performing a backpropagation of the phase-aware loss to the speech enhancement model, the one or more speech enhancement model parameters being updated to optimize the noise-suppressed speech outputs to minimize a signal quality loss in the noise-suppressed speech outputs In view of the foregoing, it will be appreciated that the disclosed embodiments provide many technical benefits over conventional systems and methods for generating machine learning training data configured to train a machine learning model to learn speech representations. The disclosed embodiments beneficially improve conventional techniques for learning and generating speech representations.

Embodiments of the present invention may comprise or utilize a special purpose or general-purpose computer (e.g., computing system 110) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., hardware storage device(s) 140 of FIG. 1) that store computer-executable instructions (e.g., computer-readable instructions 118 of FIG. 1) are physical hardware storage media/devices that exclude transmission media. Computer-readable media that carry computer-executable instructions or computer-readable instructions (e.g., computer-readable instructions 118) in one or more carrier waves or signals are transmission media. Thus, by way of example, and not limitation, embodiments of the invention can comprise at least two distinctly different kinds of computer-readable media: physical computer-readable storage media/devices and transmission computer-readable media.

Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 130 of FIG. 1) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry, or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more storage devices storing computer-readable instructions that are executable by the one or more processors to configure the computing system to at least:
obtain a speech enhancement model trained on a first training dataset to generate noise-suppressed speech outputs;
obtain an automatic speech recognition model trained on a second training dataset to generate noise-suppressed transcription output for spoken language utterances; and
optimize the speech enhancement model by iteratively alternating between (i) performing automatic speech recognition training by applying the speech enhancement model to a third training dataset comprising noisy audio and corresponding ground truth transcription labels and (ii) performing noise suppressing training applying the speech enhancement model to a fourth training dataset comprising parallel noisy audio and clean reference audio data.

2. The computing system of claim 1, the computer-readable instructions being further executable to further configure the computing system to:

apply a set of spoken language utterances to the speech enhancement model to obtain a first noise-suppressed speech output;

apply the first noise-suppressed speech output from the speech enhancement model to the automatic speech recognition model to generate a first noise-suppressed transcription output for the set of spoken language utterances;

access a set of ground truth transcription labels corresponding to the set of spoken language utterances;

update one or more speech enhancement model parameters to optimize the speech enhancement model to generate optimized noise-suppressed speech outputs based on a first comparison of the noise-suppressed transcription output and the ground truth transcription labels; and prior to updating the one or more speech enhancement model parameters, freezing a set of internal layers of the automatic speech recognition model.

3. The computing system of claim 2, the computer-readable instructions being further executable by the one or more processors to further configure the computing system to:

after obtaining the speech enhancement model and the automatic speech recognition model but prior to updating the one or more speech enhancement model parameters, concatenating the speech enhancement model and the automatic speech recognition model.

4. The computing system of claim 2, the computer-readable instructions being further executable by the one or more processors to further configure the computing system to:

obtain a set of noisy audio data and a set of clean reference audio data corresponding to the set of noisy audio data;

apply the noisy audio data to the speech enhancement model to obtain a second noise-suppressed speech output; and update the one or more speech enhancement model parameters to minimize signal quality loss during generation of the optimized noise-suppressed speech outputs based on a second comparison of the second noise-suppressed speech output and the set of clean reference audio data.

5. The computing system of claim 4, the fourth training dataset comprising a subset of the first training dataset.

6. The computing system of claim 1, the computer-readable instructions being further executable by the one or more processors to further configure the computing system to:

obtain user enrollment data comprising a speaker embedding vector corresponding to a target speaker;

extract the speaker embedding vector corresponding to the target speaker; and personalize the speech enhancement model to the target speaker by appending the speaker embedding vector to an internal layer of the speech enhancement model to configure the speech enhancement model to remove background noise and non-target speaker speech in order to generate personalized noise-suppressed speech outputs.

7. The computing system of claim 1, the speech enhancement model configured as a deep complex convolution recurrent network for phase-aware speech enhancement comprising one or more short time Fourier transform layers, a complex encoder layer, a complex unified long short term memory layer, or a complex decoder layer.

8. The computing system of claim 1, the first training dataset comprising simulated data comprising a mixture of clean speech and one or more of: room impulse responses, isotropic noise, or transient noise.

9. The computing system of claim 1, the automatic speech recognition model configured as a sequence-to-sequence model using an attention-based encoder-decoder structure.

10. The computing system of claim 1, the second training dataset comprising non-simulated audio data comprising spoken language utterances without a corresponding clean speech reference signal.

11. The computing system of claim 1, the second training dataset comprising non-simulated audio data and simulated audio data.

12. The computing system of claim 1, the computer-readable instructions that are executable by the one or more processors to configure the computing system to at least apply the third training dataset comprising a set of spoken language utterances to the speech enhancement model to obtain a first noise-suppressed speech output, the third training dataset comprising a subset of the second training dataset.

13. The computing system of claim 1, the computer-readable instructions that are executable by the one or more processors to configure the computing system to at least apply the third training dataset comprising a set of spoken language utterances to the speech enhancement model to obtain a first noise-suppressed speech output, the third training dataset comprising speech data for a target domain corresponding to one or more of: a target enterprise or a target speaking context.

14. The computing system of claim 1, the computer-readable instructions that are executable by the one or more processors to configure the computing system to at least apply the third training dataset comprising a set of spoken language utterances to the speech enhancement model to obtain a first noise-suppressed speech output, the third training dataset comprising speech data for a target domain corresponding to a particular target user.

15. The computing system of claim 1, the computer-readable instructions being further executable by the one or more processors to further configure the computing system to:

apply a set of spoken language utterances to the speech enhancement model to obtain a first noise-suppressed speech output;

apply the first noise-suppressed speech output from the speech enhancement model to the automatic speech recognition model to generate a noise-suppressed transcription output for the set of spoken language utterances;

obtain ground truth transcription labels for the set of spoken language utterances included in the third training dataset;

update one or more speech enhancement model parameters to optimize the speech enhancement model to generate optimized noise-suppressed speech outputs based on a first comparison of the noise-suppressed transcription output and the ground truth transcription labels; and update the one or more speech enhancement model parameters by adjusting a probability parameter corresponding to a frequency at which the speech enhancement model is updated.

16. The computing system of claim 1, the computer-readable instructions being further executable by the one or more processors to further configure the computing system to:
apply a set of spoken language utterances to the speech enhancement model to obtain a first noise-suppressed speech output;
apply the first noise-suppressed speech output from the speech enhancement model to the automatic speech recognition model to generate a noise-suppressed transcription output for the set of spoken language utterances;
obtain ground truth transcription labels for the set of spoken language utterances included in the third training dataset;
update one or more speech enhancement model parameters to optimize the speech enhancement model to generate optimized noise-suppressed speech outputs based on a first comparison of the noise-suppressed transcription output and the ground truth transcription labels; and
update the one or more speech enhancement model parameters to optimize (i) a word error rate of the noise-suppressed transcription output and (ii) a mean opinion score of the first noise-suppressed speech output.

17. The computing system of claim 1, wherein the computer-readable instructions are further executable by the one or more processors to configure the computing system to update a probability parameter that determines a frequency and a timing of each iteration between said (i) applying automatic speech recognition training to the speech enhancement model and (ii) applying noise suppressing training to the speech enhancement model.

18. A computing system comprising:
one or more processors; and
one or more storage devices storing computer-readable instructions that are executable by the one or more processors to configure the computing system to at least:
obtain a speech enhancement model trained on a first training dataset to generate noise-suppressed speech outputs;
obtain an automatic speech recognition model trained on a second training dataset to generate transcription labels for spoken language utterances;
obtain a third training dataset comprising (i) a first data subset comprising a set of spoken language utterances and ground truth transcription labels corresponding to the set of spoken language utterances and (ii) a second data subset comprising noisy audio data and clean reference audio data corresponding to the noisy audio data;
apply the set of spoken language utterances included in the third training dataset to the speech enhancement model to obtain a first noise-suppressed speech output;
apply the first noise-suppressed speech output from the speech enhancement model to the automatic speech recognition model to generate a noise-suppressed transcription output for the set of spoken language utterances;
apply the noisy audio data included in the third training dataset to the speech enhancement model to obtain a second noise-suppressed speech output; and
update one or more speech enhancement model parameters to optimize the speech enhancement model to generate optimized noise-suppressed speech outputs based on alternating between (i) a first comparison of the noise-suppressed transcription output and the ground truth transcription labels to facilitate a first improvement in generating noise-suppressed transcription outputs and (ii) a second comparison of the second noise-suppressed speech output and the clean reference audio data to facilitate a second improvement in generating noise-suppressed speech outputs.

19. A computing system comprising:
one or more processors; and
one or more storage devices storing computer-readable instructions that are executable by the one or more processors to configure the computing system to at least:
obtain electronic content comprising an audio stream comprising spoken language utterances;
access a speech enhancement model that is trained on a first training dataset and optimized to generate optimized noise-suppressed speech outputs by updating one or more speech enhancement model parameters based on a first comparison of noise-suppressed transcription outputs obtained from applying noise-suppressed speech outputs to an automatic speech recognition model and ground truth transcription labels corresponding to the noise-suppressed speech outputs and a second comparison of noise-suppressed transcription outputs obtained from applying noisy audio data to the speech enhancement model and clean reference audio data corresponding to the noisy speech data; and
operate the speech enhancement model to generate an optimized noise-suppressed speech output based on a portion of the audio stream.

20. The computing system of claim 19, the computer-readable instructions being further executable by the one or more processors to further configure the computing system to:
access the automatic speech recognition model that is trained on a second training dataset to generate transcription labels for spoken language utterances; and
operate the automatic speech recognition model to generate an optimized noise-suppressed transcription output based on the optimized noise-suppressed speech output from the speech enhancement model.

21. The computing system of claim 19, the one or more speech enhancement model parameters being updated by:
identifying one or more labeling errors in the noise-suppressed transcription outputs;
calculating a cross-entropy loss based on the one or more labeling errors identified in the noise-suppressed transcription outputs;
performing a backpropagation of the cross-entropy loss to the speech enhancement model, the one or more speech enhancement model parameters being updated to optimize the noise-suppressed speech outputs to minimize an occurrence of labeling errors in the noise-suppressed transcription outputs;
calculating a phase-aware loss based on the second comparison; and
performing a backpropagation of the phase-aware loss to the speech enhancement model, the one or more speech enhancement model parameters being updated to optimize the noise-suppressed speech outputs to minimize a signal quality loss in the noise-suppressed speech outputs.

22. A computing system comprising:
one or more processors; and
one or more storage devices storing computer-readable instructions that are executable by the one or more processors to configure the computing system to at least:
- update a speech enhancement model trained on a training dataset to generate noise-suppressed speech outputs by iteratively alternating between (i) applying automatic speech recognition training to the speech enhancement model and (ii) applying noise suppressing training to the speech enhancement model; and
- update a probability parameter that determines a frequency and a timing of each iteration between said (i) applying automatic speech recognition training to the speech enhancement model and (ii) applying noise suppressing training to the speech enhancement model.

* * * * *